Figure 1:
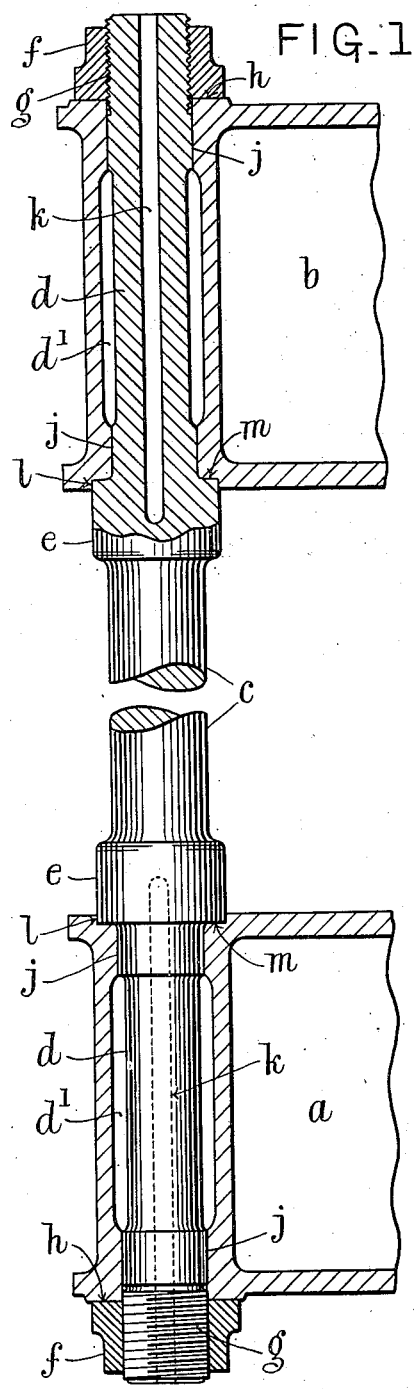

T. E. HOLMES.
HYDRAULIC PRESS.
APPLICATION FILED AUG. 17, 1914.

1,149,518.

Patented Aug. 10, 1915.

WITNESSES.

INVENTOR.

UNITED STATES PATENT OFFICE.

THOMAS EDMUND HOLMES, OF NETHER EDGE, SHEFFIELD, ENGLAND, ASSIGNOR OF ONE-HALF TO DAVY BROTHERS LIMITED, OF SHEFFIELD, ENGLAND.

HYDRAULIC PRESS.

1,149,518.      Specification of Letters Patent.      Patented Aug. 10, 1915.

Application filed August 17, 1914. Serial No. 857,195.

*To all whom it may concern:*

Be it known that I, THOMAS EDMUND HOLMES, a subject of the King of Great Britain, and resident of 8 Oakdale road, Nether Edge, Sheffield, England, have invented certain new and useful Improvements in Hydraulic Presses, of which the following is a specification.

In hydraulic presses wherein the baseplate and entablature, constituting what may be termed the abutment-members of the framework of the press, are united by columns which form the tension members of the framework and (as is commonly the case) also serve as guides for the presshead, the rigidity and stability of the structure of the framework depend not only upon the stiffness of the columns but also, very largely, upon the security with which the respective abutment-members are attached to the columns.

In the arrangement hitherto in general use, each abutment-member is held between two nuts on each column, and inasmuch as, under severe tensile stress, the columns tend to stretch so as to allow of the inside nuts (*i. e.* the upper baseplate-nut and the lower entablature-nut) becoming loosened, it has been the practice to tighten these nuts while the press is subjected to an overload; it being assumed that the columns, when relieved of the overload, will by their consequent contraction bring the abutment-members into contact with the inner nuts with a permanent pressure sufficient to prevent these nuts becoming subsequently loosened in consequence of any stretching of the columns under the stress of the maximum working load. The method just described does not, however, in practice prove entirely satisfactory, owing chiefly to the fact that the deflection of the abutment-members when loaded (and more particularly when overloaded) produces obliquity as between the bearing-face of each inner nut and the contiguous surface of the corresponding abutment-member, thus preventing these nuts from being then tightened to their full limit over the whole extent of their bearing surface. Moreover, there are practical difficulties incidental to the operation of tightening the inner nuts, as well as to the provision of means for effectually counteracting the tendency of these nuts to become slackened as a result of vibration set up in the press; while in addition, the defects and difficulties referred to are accentuated by reason of the increasingly high speeds at which, in modern practice, forging presses are required to work and the eccentric loading to which they are liable to be subjected.

According to the present invention, which is designed to overcome these troubles, the inner nuts are dispensed with and replaced by a fixed shoulder on each column, while each outer nut (*i. e.* the lower baseplate-nut and the upper entablature-nut) is caused to grip the corresponding abutment-member against the co-acting shoulder with a permanent pressure exceeding the maximum pressure to which the nut in working is subject, this permanent pressure being obtained without the necessity of overloading the press or straining and deflecting the abutment-members during the operation of tightening the nuts. For this purpose each of what may be called the bearing-portions of the length of each column, that is to say each portion which, passing through an abutment-member, connects together a shoulder and the co-acting nut, is lengthened by the application of heat during the operation of tightening the nut, so that, on being allowed to cool after the nut has been screwed home, this bearing-portion of the column will contract in length with the result that the abutment-member will be gripped between the nut and shoulder with a force which may be predetermined so as to exceed the maximum force which, under working conditions, tends to stretch the bearing-portion of the column and thus to separate the nut from the shoulder.

The local heating, and consequent temporary lengthening of each bearing-portion of a column may be effected by introducing steam, hot water, an electric heating-coil, or other heating medium or agent into an axial cavity formed in each end of the column and extending from its extremity approximately as far as the corresponding shoulder; the temperature, during the operation of tightening the nut, being raised to an extent such that the permanent contractile stress to which the bearing-portion of the column when cooled is subjected exceeds the tensile stress to which the column is subject under the maximum working load.

The shoulders on the columns may be constituted each by the end of a collar which is formed integrally with the column. Each column would, as usual, fit laterally the passage or bearing provided for it in each abutment-member, the fit extending throughout the whole or part of the depth of such passage or bearing. In addition, each shoulder or collar may enter a recess provided in the upper face of the baseplate or the lower face of the entablature (as the case may be), and may either present a flat face and rectangular profile to fit corresponding surfaces in the recess, or (in order the better to resist any tendency to lateral displacement) may have a conical face or end adapted to fit a correspondingly coned recess.

Figure 2:
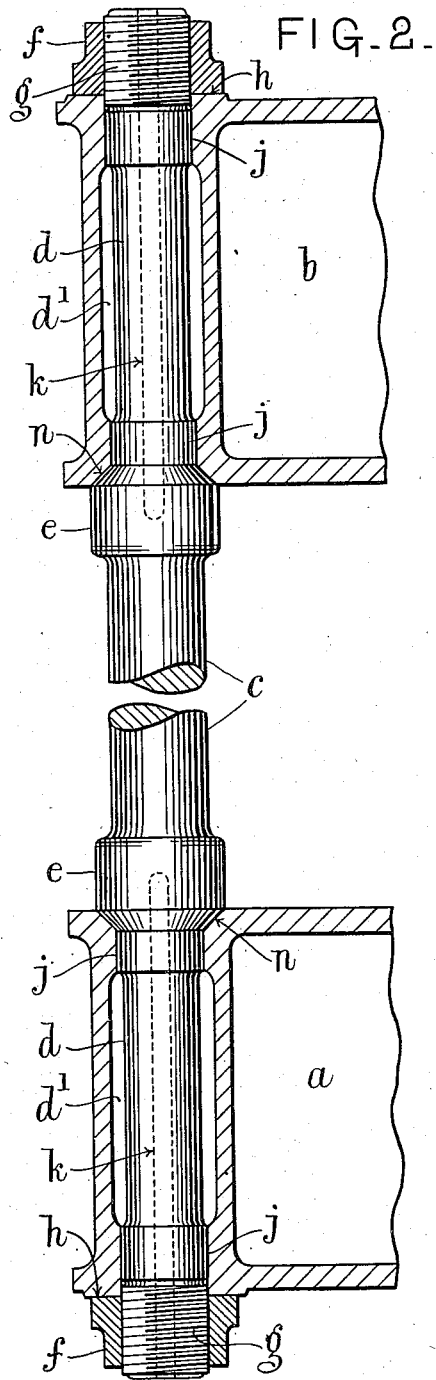

In the accompanying drawings, Figure 1 is a side elevation showing an example of one of the columns of a hydraulic forging press constructed according to the present invention, the adjacent portions of the baseplate and entablature, as well as the upper portion of the column, being in section. Fig. 2 is a similar view showing a slight modification, the column being shown only in elevation.

In each figure $a$ is the baseplate and $b$ the entablature of the press (these forming the respective abutment-members of the framework of the press), while $c$ is the body-portion of the length of a column (which forms one of the tension-members of the framework).

$d$ are what have already been referred to as the bearing-portions of the column, each of these bearing-portions being a continuation of the middle portion $c$ beyond a collar $e$ formed integrally with the column and adapted to bear against the inner side of the corresponding abutment-member.

Each bearing-portion $d$ of the column is cylindrical and of sufficient length to pass clear through an aperture $d^1$ which traverses the depth of the corresponding abutment-member $a$ or $b$ and to receive, beyond the latter, a nut $f$ which, screwing upon the threaded end-portion $g$ of the column, bears against a face $h$ provided on the outer side of the abutment-member $a$ or $b$ so as to clamp said abutment-member against the coacting collar $e$; the bearing-portion $d$ (in the examples illustrated) fitting within the aperture $d^1$ at $j, j$ as shown.

$k$ is an axial cavity extending from each extremity of the column as far as the collar $e$, each cavity $k$ being adapted for the introduction into it of steam, hot water, an electric heating-coil, or other convenient heating medium or agent.

When the framework of the press has been erected, the selected heating medium or agent is introduced into each cavity $k$ so as to cause the corresponding bearing-portion $d$ of the column to become lengthened. On this lengthening process being accomplished, the nut $f$ is tightened against the face $h$, and thereupon the heating medium or agent is withdrawn from the cavity (or the bearing-portion $d$ otherwise allowed to cool to normal temperature), with the result that, by the consequent contraction in the length of the bearing-portion, the nut $f$ is drawn against the face $h$ with a permanent pressure much greater than could be produced by the screwing home of the nut. The rise of temperature and consequent increase of length produced in each bearing-portion $d$ of the column should be such that the permanent contractile stress to which the bearing-portion, when cooled, is subjected, exceeds the tensile stress to which the column is subject under the maximum working load on the press.

In the examples illustrated, each collar $e$ is cylindrical. In Fig. 1 each collar fits as at $l$ within a circular recess provided in the face of the corresponding abutment-member $a$ or $b$, and has a flat face adapted to bear as at $m$ against a corresponding flat surface forming the bottom of the recess. In Fig. 2, each collar has a conical face adapted to bear as at $n$ against a correspondingly coned surface forming the bottom of the recess.

It will be obvious that whereas, with the method of construction heretofore employed (and already explained), it was necessary to tighten all the inner nuts during the time the press was subjected to an overload, with the method of construction constituting the present invention not only is such overloading of the press entirely obviated, but the nut on each end of each column may be tightened separately and independently.

What I claim is:—

1. The hereinbefore described method of insuring the tightness of a nut which, by screwing upon a threaded portion of a column constituting a tension-member of the framework of a hydraulic press, serves to clamp the base-plate or entablature constituting an abutment-member of said framework against a shoulder provided on the column, said method consisting in lengthening by heat, during the operation of tightening the nut, that portion of the column which connects the nut and shoulder, and allowing said portion of the column to cool after the tightening operation is accomplished.

2. In the framework for a hydraulic press, a tension-column, two abutment-members united thereby, nuts carried by threaded portions of the column and adapted to bear against the outer sides of the respective abutment-members, shoulders on the column adapted to bear against the inner sides of the respective abutment-members, and means for enabling each portion of the column which connects together a nut and the co-acting shoulder to be temporarily lengthened by the application of heat.

3. In the framework for a hydraulic press, a tension-column, two abutment-members united thereby, nuts carried by threaded portions of the column and adapted to bear against the outer sides of the respective abutment-members, shoulders on the column adapted to bear against the inner sides of the respective abutment-members, said column having axial cavities extending from its respective extremities approximately as far as the corresponding shoulders and each adapted to admit a heating agent.

4. A tension-column for the framework of a hydraulic press, provided toward each end with a shoulder, a threaded portion between said shoulder and the adjacent extremity of the column, a nut for screwing on said threaded portion, said column having an axial cavity extending from its extremity approximately as far as the corresponding shoulder and adapted to admit a heating agent.

5. In a framework for a hydraulic press, a tension-column, two abutment-members fitting upon and united by said column, nuts carried by threaded portions of the column and adapted to bear against the outer sides of the respective abutment-members, shoulders on the column having each a conical face adapted to fit within a conical recess at the inner side of the corresponding abutment-member, said column having axial cavities extending from its respective extremities approximately as far as the corresponding shoulders and adapted to admit a heating agent.

THOMAS EDMUND HOLMES.

Witnesses:
   JOHN B. BARDSLEY,
   CYRIL FIDLER.